United States Patent [19]

Kageyama

[11] Patent Number: 4,636,953
[45] Date of Patent: Jan. 13, 1987

[54] X-RAY IMAGE CORRECTION APPARATUS

[75] Inventor: Satoshi Kageyama, Yokohama, Japan

[73] Assignee: Kabushiki Kaisha Toshiba, Kawasaki, Japan

[21] Appl. No.: 607,277

[22] Filed: May 4, 1984

[30] Foreign Application Priority Data

May 10, 1983 [JP] Japan .................................. 58-81411

[51] Int. Cl.$^4$ .............................................. H04N 5/32
[52] U.S. Cl. .................................... 364/414; 382/42; 358/111
[58] Field of Search ..................... 364/414; 382/42, 43; 358/111; 378/19, 99, 901, 62

[56] References Cited

U.S. PATENT DOCUMENTS

| | | | |
|---|---|---|---|
| 4,049,958 | 9/1977 | Hartmann | 364/728 |
| 4,084,255 | 4/1978 | Casasent et al. | 382/43 |
| 4,188,640 | 2/1980 | Dittrich et al. | 378/22 |
| 4,558,462 | 12/1985 | Horiba et al. | 382/42 |
| 4,564,861 | 1/1986 | Hishinuma et al. | 378/162 |

FOREIGN PATENT DOCUMENTS 0105126 10/1981 European Pat. Off. .
0038663 11/1984 European Pat. Off. .

OTHER PUBLICATIONS

European Search Report 11/14/84 0125130.

Primary Examiner—Jerry Smith
Assistant Examiner—Charles B. Meyer
Attorney, Agent, or Firm—Oblon, Fisher, Spivak, McClelland & Maier

[57] ABSTRACT

An X-ray image correction apparatus has a subtraction processing circuit for subtracting image signals read out from the memories which store X-ray image signals corresponding to X-ray images taken before and after the injection of a contrast medium. An interest area is specified in the part which does not vary readily from the injection of the medium and this interest area is divided into a plurality of sections for each of which a position correction valve is calculated by a position correction valve calculator. The most common correction value of all the sections is used to correct misalignment between the before- and after-injection images.

9 Claims, 5 Drawing Figures

FIG. 1
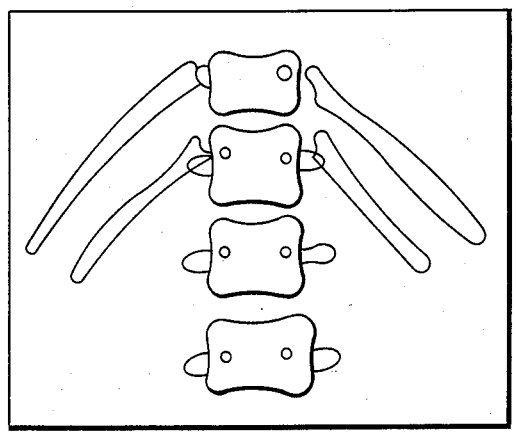
FIG. 2
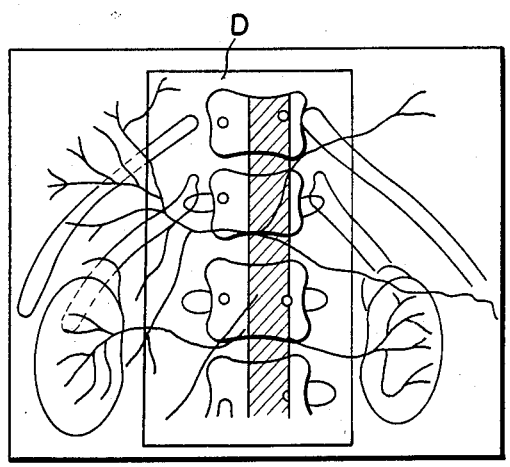
FIG. 3

X-RAY IMAGE CORRECTION APPARATUS

BACKGROUND OF THE INVENTION

This invention relates to an X-ray image correction apparatus and, in particular, to an X-ray image correction apparatus which is used in an X-ray diagnosis system in which an X-ray contrast medium is injected into the patient for performing X-ray diagnosis.

Recently, attention has been drawn to systems in which the video signal from an X-ray television camera, which uses an X-ray image intensifier, is processed to obtain an X-ray diagnosis image of the patient. However, if the video signals of the camera are displayed as is on the screen, unwanted images will also be included in the image, making diagnosis difficult. A method has been developed in which the unwanted images are eliminated and only those images required for diagnoses are displayed. This is called the subtraction method. In this method, images obtained before and after the patient is injected with an X-ray contrast medium are subtracted to cancel out the unwanted images. For example, in a cerebral angiograph image, the image of the cranium before the contrast medium is injected (mask image) and the superposed image of the cranium image and the blood vessel image after the medium has been injected are subtracted to cancel out the cranium image, leaving behind a blood vessel image of high contrast.

With this subtraction method based on the injection of contrast medium into the vein, the X-ray contrast medium injected into the patient flows from the veins to the heart to the arteries. After the first X-ray image of the desired location is taken, the medium is injected and, after a specified time calculated based on the speed of the medium has elapsed for the medium to reach the desired location, a second X-ray image is taken. If the patient moves during this time gap between the first and second images, the location to be diagnosed is moved and the image obtained by subtraction processing of the first and second image will contain undesired images, resulting in a reduction in image quality.

SUMMARY OF THE INVENTION

This invention provides an X-ray image correction apparatus which outputs a high contrast image which is automatically corrected for misalignment between the first and second image caused by movement of the patient.

An interest area is established in an area of subject corresponding to the image which varies very little due to the contrast medium. This interest area is divided into a plurality of sections for each one of which a position correction value is calculated. For example, a correction value for many sections is taken from the position correction values of all the sections, and based on this value, the misalignment between the first and second image is corrected.

BRIEF DESCRIPTION OF THE DRAWINGS

FIG. 1 shows the mask image.

FIG. 2 shows a contrast image.

FIG. 3 shows the region obtained by dividing the interest regions.

DETAILED DESCRIPTION OF THE PREFERRED EMBODIMENT

A brief explanation of the basic principles involved in this invention will be given before describing the preferred embodiment. FIGS. 1 and 2 illustrate a mask image and a contrast image, respectively. Interest area D is established in the contrast image shown in FIG. 2 and is divided into 15 sections having a width $\Delta X$ and height $\Delta Y$, as is shown in FIG. 3. The position correction value for each section is determined and from a plurality of these values the correction to be applied is determined by the majority of values.

For performing this correction value calculation a round robin method or hill climbing method is used as the position correction algorythm, the hill climbing method being the most common. In the hill climbing method an affine transformation image $A'$ is found for contrast image B which corresponds to mask image A. The affine transformation formula is $$x' = ax + by + c$$
$$y' = dx + ey + f \quad (1)$$

$x'$ and $y'$ being the coordinates after affine transformation; x, y, the coordinates before transformation; a-f, the magnification ratio, reduction ratio, rotation angle, x parallel movement quantity and y parallel movement quantity. By applying gain transformation value g to affine transformation image $A'$, a gain transformed image $A''$ is obtained. Namely, $gA'(x,y) = A''(x,y)$ is determined. Formula (2), which shows the error evaluation function E(s) obtained from the difference between $A''(x,y)$ and $B(x,y)$, determines a-g such that E(s) is the minimum.

$$E(s) = 1/M \cdot \Sigma |A''(x, y) - B(x, y)| (x, y) \in \text{WINDOW} \quad (2)$$

Figure 4:
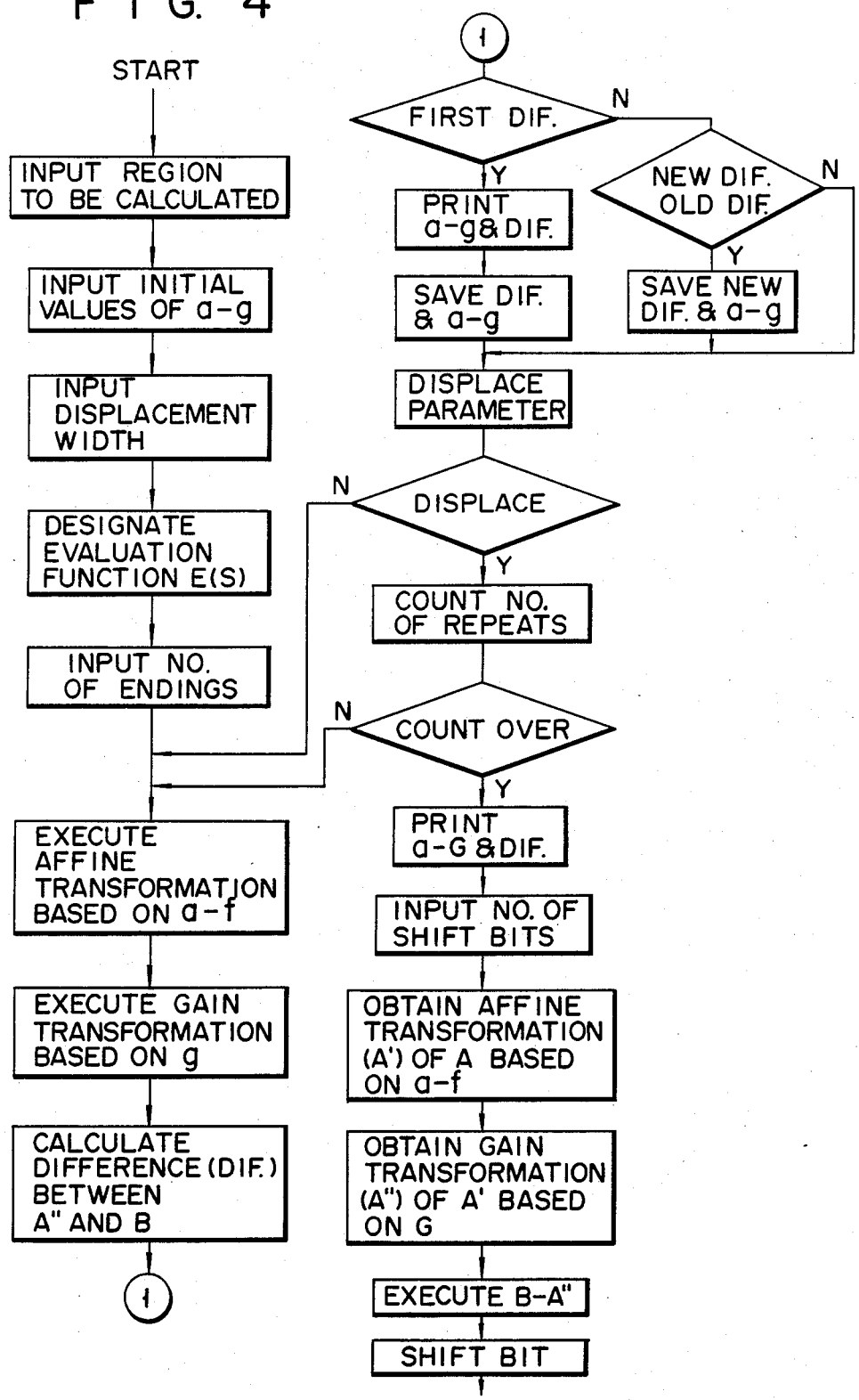
FIG. 4 is an operation flowchart of the position correction value calculator.

This calculation will be described in detail with reference to the flowchart of FIG. 4. First, the initial values of a-g, variation dimensions $\Delta a$ to $\Delta g$ of a-g, evaluation function E(s), and the number of endings is set. a-f are substituted into Formula (1) and, after the affine transformation has been performed and image $A''$ has been gain transformed by g, Formula (2) is calculated. Namely, the difference between $A''$ and $B''$ is calculated. Then, it is determined whether this difference is the initial difference and, if yes, the difference and a-g are printed and saved. Next, the parameters are displaced by an amount equal to the specified variation dimension. If the displacement of a-f is not completed, the process returns to the affine transformation which is based on Formula (1) and the above process is repeated. The new difference obtained in this way is compared with the old difference and, when the old difference is larger than the new difference, the new difference at this time and a-g are saved. Next, the parameters are again displaced. The operation is repeated until the displacement of a-g is completed. Then, the number of repetitions is counted and if the they are equal to a preset number of endings, a-g are determined such that E(s) is the minimum. After this, a-f are substituted into Formula (1) and contrast image A is affine transformed to determine image $A'$. Image $A'$ is gain transformed by g to determine image A". then, A" is subtracted from B to produce the subtraction image.

In this way, based on the hill climbing method the minimum values for the evaluation functions E(s); i.e., the correction values, are determined for all the divided sections. These correction values corresponding to the divided sections shown in FIG. 4 are assumed to be shown in the following Table, for example. The correction values are shown as coordinates (xm, ym) and one image corresponds to one line.

TABLE

| Cell Area | Correction Value |
|---|---|
| 1-1 | 0,0 |
| 1-2 | 1,1 |
| 1-3 | 1,1 |
| 2-1 | 0,1 |
| 2-2 | 6,1 |
| 2-3 | 7,1 |
| 3-1 | −6,2 |
| 3-2 | 1,1 |
| 3-3 | 1,1 |
| 4-1 | 0,0 |
| 4-2 | 1,1 |
| 4-3 | 1,1 |
| 5-1 | 6,−3 |
| 5-2 | 1,1 |
| 5-3 | 1,1 |

According to the above table, the correction value (1.1) covers 8 sections out of 15 and is determined as a value which is correct by majority.

Figure 5:
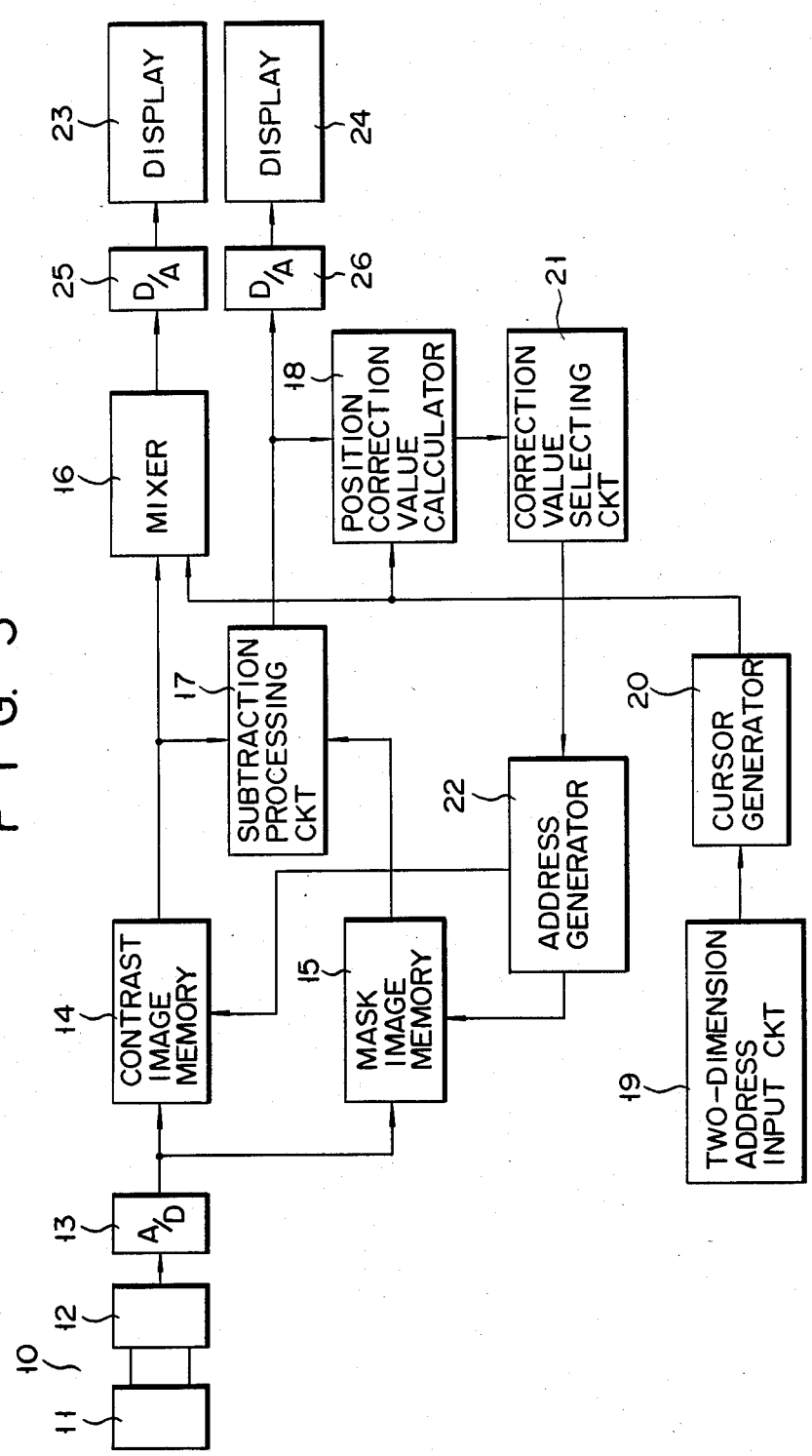
FIG. 5 is a schematic diagram of the X-ray image correction apparatus according to an embodiment of the invention.

This invention is based on the above principles. The following is a description of the construction of the X-ray image correction apparatus with reference to FIG. 5.

Image pick-up section 10 is comprised of image intensifier 11 and TV camera 12, which is mounted on the image intensifier. The output terminal of TV camera 12 is connected through analog-to-digital (A/D) converter 13 to the input terminals of contrast image memory 14 and mask image memory 15. The output terminal of contrast image memory 14 is connected to one of the input terminals of mixer 16 and subtraction processing circuit 17, which subtracts the mask image and the contrast image. The output terminal of mask image memory 15 is connected to the other input terminal of subtraction processing circuit 17. The output terminal of subtraction processing circuit 17 is connected to one of the input terminals of position correction value calculator 18. Two-dimension address input circuit 19 is connected to the input terminal of cursor generator 20 whose output terminal is connected to the other terminals of mixer 16 and position correction value calculator 18 whose output terminal is connected to the input terminal of correction value selecting circuit 21. The output terminal of correction value selecting circuit 21 is connected to the input terminal of address generator 22 whose address output terminals are connected to the address input terminals of contrast image memory 14 and mask image memory 15.

The output terminals of mixer 16 and subtraction processing circuit 17 are respectively connected to display devices 23 and 24 through digital-to-analog (D/A) converters 25 and 26.

With this device, an X-ray image is taken by TV camera 13 of image pick-up section 11 before the injection of a contrast medium. This image may, for example, comprise 512×512 picture elements and be stored in mask image memory 15 as the mask image shown in FIG. 1. Next, after the patient is injected with the contrast medium, another X-ray image is taken and stored in contrast image memory 14 as the contrast image shown in FIG. 2, for example. Then, when contrast image memory 14 is accessed via address generator 22, the contents; i.e., the contrast image information is read out and supplied to display device 23 via mixer 16 and D/A converter 25, and the contrast image shown in FIG. 2 is displayed. Then, two-dimension addressing unit 19 (track ball) is operated while observing the display to establish the interest area. When it is established, a two-dimension address data is supplied to cursor generator 20, which outputs a cursor signal to mixer 16, where the cursor signal and the contrast image information are mixed and sent to display device 23 through D/A converter 25. Now, cursor line CL is displayed with the contrast image on display device 23. The area enclosed by cursor line CL becomes the interest area D whose size and position can be varied by adjusting two-dimension addressing unit 19. With the establishment of this interest area, an area which is not readily varied by the contrast medium and of 64×64 picture elements in size, for example, is established.

The contents of contrast image memory 14 and mask image memory 15 are accessed via address generator 22 and read into subtraction processing circuit 17 where the contents are subtraction processed. The subtraction image signal from subtraction processing circuit 17 is supplied to display device 24 through D/A converter 26 to produce the subtracted image.

The subtraction image signal is also supplied to position correction value calculator 18, which calculates a position correction value such that the error evaluation function of the contrast and mask images in the interest area D is the minimum. In this case, interest area D is divided into 8×8 sections and the position correction value is calculated for each. Namely, position correction value calculator 18 calculates the evaluation function E(s) for the correction value from subtraction information s; i.e., the output of subtraction processing circuit 17.

$$E(s) = 1/M \cdot \Sigma |s|$$

or $$E(s) = 1/M \cdot \Sigma s^2$$

where s indicates the back image data remaining from the subtraction process and M is the coefficient for determining the mean error value obtained by dividing the mask image by the contrast image.

Based on the above equation, position correction value calculator 18 calculates E(s) for the 8×8 sections and outputs the result to correction value selector 21 where an often generated correction value; e.g., (1,1) is selected. This selected correction value (1,1) is supplied to address generator 22, which specifies an address (x,y) in mask memory 15 and an address (x+1, y+1), which takes into consideration the correction value (1,1), in contrast image memory 14. Namely, one picture element from mask image memory 15 is shifted by one line and the contrast image is read out from memory 14. This contrast image, which is read out in response to the correction value, is supplied to subtraction processing circuit 17, where subtraction processing is performed on the mask image to obtain a good quality subtraction image in which the position misalignment of the mask and contrast images has been corrected. When this subtraction image is supplied to display device 24 through D/A converter 26, an image in which the contrast image alone is emphasized is displayed.

In the above embodiment, only a correction value that has a high frequency of generation is used. It is possible, however, to obtain a more accurate correction value by obtaining the average of this correction value and the surrounding values. For example, if there are correction values, such as (0,0) and (0,1), which are close to the correction value of (1,1), these are used in determining the eventual correction value. For example, if 30 of the total 64 correction values are (1,1) and there are ten values each of (0,0) and (0,1), then the average of 50 values would be determined. This average correction value would be $x=30/50$, $y=40/50$. This averaged correction value is more accurate than the maximum frequency correction value and so a higher quality subtraction image is produced.

Although the image before injection of a contrast medium is used as the mask image, it is possible to use the image taken during the initial period of injection.

It is easier to set the interest area in relation to the image on which subtraction processing has taken place, i.e., the image displayed on display device 24.

In the above example, the interest area was in one location but it is possible for it to be in a plurality of locations, in which case, the correction value for each location is determined and misalignment in each area accurately corrected. In this case, the correction value is determined using an interpolation or extrapolation method for each area. For example, when there are two interest areas, D1 and D2, the correction value for the area D3 between the two interest areas is determined as the average of the correction values of areas D1 and D2. The correction value of area D4, which is separated from the interest areas D1 and D2, is extrapolated from that of the interest areas.

During position correction, address correction may be carried out in relation to either the contrast image memory or the mask image memory.

As was described above, according to this invention the interest area is divided into a plurality of regions and the correction value determined for each area. The suitable correction value is then determined by the majority of values from all the regions so the correction error is small and the the accuracy of image correction improved.

What is claimed is:

1. An X-ray image-correction apparatus comprising:
    first memory means for storing a first X-ray image signal corresponding to a first X-ray image of a subject;
    second memory means for storing a second X-ray image signal corresponding to a second X-ray image taken later than said first X-ray image;
    address means for outputting address signals used for reading out image signals from said first and second memory means;
    subtraction means for performing subtraction processing between the first and second X-ray image signals read out from said first and second memory means;
    interest area specifying means for specifying at least one interest area in the X-ray image corresponding to the subtraction-processed image signals;
    calculating means for calculating a position correction value for each of a plurality of sections obtained by dividing the interest area, to obtain a plurality of position correction values corresponding to a plurality of sections;
    selecting means for selecting at least the position correction value appearing most frequently among the position correction values; and
    correcting means for determining the actual correction value from at least the selected position correction value and controlling said address means to correct the address signals designating said first and second memory means by the actual correction value 2. An X-ray image correction apparatus according to claim 1, wherein said first memory means stores an X-ray image signal corresponding to the X-ray image before injection of the subject with a contrast medium, and said second image memory means stores the X-ray image signal corresponding to the X-ray image taken after the injection of the subject with a contrast medium.

3. An X-ray image correction apparatus according to claim 1, wherein said interest area specifying means specifies a plurality of interest areas in the X-ray image.

4. An X-ray image correction apparatus according to claim 1, wherein said interest area specifying means comprises a two-dimension addressing means which outputs an address signal corresponding to the interest area and cursor generating means which generates a cursor signal in response to the address signal of said two-dimension addressing means.

5. An X-ray image correction apparatus according to claim 1, wherein said position correction calculating means includes means for calculating an evaluation function in relation to the position correction value for the interest area specified by said interest area specifying means from the subtraction image signal of said subtraction means.

6. An X-ray image correction apparatus according to claim 1, wherein said selecting means selects a correction value which is generated the maximum number of times of the correction values corresponding to a plurality of sections as the actual value.

7. An X-ray image correction apparatus according to claim 1, wherein said selecting means is comprised of means for selecting the correction values that are generated the maximum number of times of the correction values corresponding to the plurality of sections and the correction values closest to these values, which are calculated by said position correction value calculating means, calculating the average of the selected correction values and outputting the average as the actual value.

8. An X-ray image correction apparatus according to claim 1, wherein said interest area specifying means includes means for displaying a cursor line corresponding to the interest area on the second image.

9. An X-ray image correction apparatus according to claim 1, wherein said interest area specifying means includes means for displaying a cursor line corresponding to the interest area on the image corresponding to the subtraction processed image signal.

* * * * *